United States Patent
Farley et al.

(10) Patent No.: US 10,104,829 B2
(45) Date of Patent: Oct. 23, 2018

(54) SYSTEM FOR DIRECTIONAL CONTROL OF AIR FLOW IN A HARVESTOR

(71) Applicant: CNH Industrial America LLC, New Holland, PA (US)

(72) Inventors: Herbert M. Farley, Elizabethtown, PA (US); Matthew D. Weeks, Troupsburg, NY (US)

(73) Assignee: CNH Industrial America LLC, New Holland, PA (US)

( * ) Notice: Subject to any disclaimer, the term of this patent is extended or adjusted under 35 U.S.C. 154(b) by 379 days.

(21) Appl. No.: 14/793,361

(22) Filed: Jul. 7, 2015

(65) Prior Publication Data
US 2017/0006764 A1 Jan. 12, 2017

(51) Int. Cl.
| | |
|---|---|
| *B60K 11/00* | (2006.01) |
| *A01B 76/00* | (2006.01) |
| *A01D 41/12* | (2006.01) |
| *B60K 11/08* | (2006.01) |
| *F01P 11/10* | (2006.01) |
| *A01D 69/00* | (2006.01) |
| *B60K 11/06* | (2006.01) |
| *A01D 101/00* | (2006.01) |

(52) U.S. Cl.
CPC .............. *A01B 76/00* (2013.01); *A01D 41/12* (2013.01); *A01D 41/1252* (2013.01); *A01D 69/00* (2013.01); *B60K 11/06* (2013.01); *B60K 11/085* (2013.01); *F01P 11/10* (2013.01); *A01D 2101/00* (2013.01); *B60Y 2200/222* (2013.01); *Y02T 10/88* (2013.01)

(58) Field of Classification Search
CPC .... A01B 76/00; A01D 41/00; A01D 41/1261; A01D 41/12; A01D 41/1252; A01D 69/00; A01D 69/005; F01P 11/10; F01P 11/06; F01P 11/12; F01P 11/0285; F01P 1/00; F01P 1/06; F01P 1/08; F01P 2001/005; B60K 11/00; B60K 11/06; B60K 11/085; B60K 11/08; B60K 11/02; B60K 11/04; B60K 13/00; B60K 13/06; B60K 13/04

See application file for complete search history.

(56) References Cited

U.S. PATENT DOCUMENTS

| | | | | |
|---|---|---|---|---|
| 3,384,232 A | * | 5/1968 | Turnbull | ................ A01D 41/12 209/11 |
| 3,636,684 A | | 1/1972 | Vogelaar et al. | |
| 3,760,813 A | | 9/1973 | Mathews | |

(Continued)

FOREIGN PATENT DOCUMENTS

EP 2368417 A1 9/2011

OTHER PUBLICATIONS

European Search Report, 16178077.0-1656; dated Nov. 8, 2016.

*Primary Examiner* — James M Dolak
(74) *Attorney, Agent, or Firm* — Patrick M. Sheldrake (57) ABSTRACT

An airflow directional control system in an agricultural harvester having a grain tank or other structure, an internal combustion engine and a cooling system cooler box disposed between the grain tank or other structure and the internal combustion engine includes a cooler box cover over the cooler box between the grain tank or other structure and the internal combustion engine, at least one air director between the cooling box and the internal combustion engine and a panel adjustment system controlling tilt of side panels of the harvester.

14 Claims, 7 Drawing Sheets

(56) References Cited

U.S. PATENT DOCUMENTS

| | | | | |
|---|---|---|---|---|
| 3,786,891 | A * | 1/1974 | Vogelaar | A01D 41/12 180/68.4 |
| 3,788,418 | A * | 1/1974 | Clancy | B62D 55/062 180/68.4 |
| 4,233,040 | A * | 11/1980 | Vogelaar | A01D 41/12 55/282.5 |
| 4,514,201 | A * | 4/1985 | Brown | B01D 46/26 180/68.1 |
| 4,606,422 | A * | 8/1986 | Jewett | B60K 11/08 180/68.1 |
| 5,474,498 | A | 12/1995 | Rauckman | |
| 5,673,964 | A * | 10/1997 | Roan | B60H 1/00028 296/208 |
| 7,507,270 | B2 | 3/2009 | Maas et al. | |
| 7,875,093 | B1 * | 1/2011 | Hershbarger | A01D 41/1252 55/282.5 |
| 7,946,368 | B2 * | 5/2011 | Vandike | F02M 35/164 180/68.1 |
| 7,997,238 | B2 * | 8/2011 | D'hondt | A01D 41/1252 123/195 C |
| 8,230,959 | B2 | 7/2012 | Chaney et al. | |
| 8,596,396 | B1 | 12/2013 | Ricketts | |
| 9,055,715 | B2 * | 6/2015 | Isfort | A01D 61/00 |
| 9,662,967 | B2 * | 5/2017 | Rutschmann | B60K 13/02 |
| 2007/0187075 | A1 * | 8/2007 | Yamada | E02F 9/0866 165/135 |
| 2008/0016833 | A1 * | 1/2008 | Sheidler | B01D 46/0046 55/385.3 |
| 2010/0006361 | A1 | 1/2010 | Vandike et al. | |
| 2012/0267180 | A1 * | 10/2012 | Wang | A01D 41/12 180/68.1 |

\* cited by examiner

SYSTEM FOR DIRECTIONAL CONTROL OF AIR FLOW IN A HARVESTOR

BACKGROUND OF THE INVENTION

1. Field of the Invention

The present invention generally relates to agricultural vehicles, and, more specifically, to fluid cooling systems used with such vehicles. Particularly, the invention relates to air flow into, through and out of the fluid cooling system.

2. Description of the Related Art

An agricultural vehicle known as a "combine" is historically termed such because it combines multiple harvesting functions, such as picking, threshing, separating and cleaning in a single harvesting unit. A typical combine includes a header, which removes a crop from a field, and a feeder housing, which transports the crop matter into a threshing rotor. The threshing rotor rotates within a perforated housing, which may be in the form of adjustable concaves, and performs a threshing operation on the crop to remove the grain. Once the grain is threshed, the grain falls through perforations in the concaves onto a grain pan. From the grain pan, the grain is cleaned using a cleaning system. The grain is then transported to a grain tank onboard the combine. A cleaning fan blows air through sieves to discharge chaff and other debris toward the rear of the combine. Non-grain crop material, such as straw from the threshing section, proceeds through a residue system, which may utilize a straw chopper to process the non-grain material and direct it out the rear of the combine. When the grain tank becomes full, the combine is positioned adjacent a vehicle into which the grain is to be unloaded, such as a semi-trailer, gravity box, straight truck, or the like; and an unloading system on the combine is actuated to transfer the grain into the vehicle.

More particularly, a rotary threshing or separating system includes one or more rotors which can extend axially (front to rear) or transversely within the body of the combine, and which are partially or fully surrounded by a perforated concave. The crop material is threshed and separated by the rotation of the rotor within the concave. Coarser non-grain crop material such as stalks and leaves are transported to the rear of the combine and discharged back to the field. The separated grain, together with some finer non-grain crop material such as chaff, dust, straw, and other crop residue are discharged through the concaves and fall onto a grain pan where they are transported to a cleaning system. Alternatively, the grain and finer non-grain crop material may also fall directly onto the cleaning system itself.

A cleaning system further separates the grain from non-grain crop material, and typically includes a fan directing an airflow stream upwardly and rearwardly through vertically arranged sieves which oscillate in a fore and aft manner. The airflow stream lifts and carries the lighter non-grain crop material towards the rear end of the combine for discharge to the field. Clean grain that is heavier, and larger pieces of non-grain crop material that are not carried away by the airflow stream, fall onto a surface of an upper sieve (also known as a chaffer sieve) where some or all of the clean grain passes through to a lower sieve (also known as a cleaning sieve). Grain and non-grain crop material remaining on the upper and lower sieves are physically separated by the reciprocating action of the sieves as the material moves rearward. Any grain and/or non-grain crop material remaining on the top surface of the upper sieve are discharged at the rear of the combine. Grain falling through the lower sieve lands on a bottom pan of the cleaning system, where it is conveyed forwardly toward a clean grain auger.

The clean grain auger conveys the grain to a grain tank for temporary storage. The grain accumulates to the point where the grain tank is full and is discharged to an adjacent vehicle such as a semi trailer, gravity box, straight truck or the like by an unloading system on the combine that is actuated to transfer grain into the vehicle.

Agricultural combines tend to become larger and more sophisticated over time. As the size of the combines increase, the power requirements also increase. More power means more heat generated onboard the combine. Onboard components such as an internal combustion (IC) engine, hydraulic circuits, an air conditioning (A/C) circuit, etc. have internal fluids that require cooling. To this end, combines typically include several discrete fluid coolers located at various convenient locations onboard the combine. Such coolers are effective to cool the respective components, but take up additional room onboard the combine, and may not be located at the best location to avoid chaff, dust, etc. from plugging the screen or radiator.

An agricultural combine operating in a field generates significant dust, dirt, debris and crop residue, etc., which are referred to herein collectively as "contaminants". Dirt and dust are raised simply from the movement of the equipment across the field. The cutting, threshing, screening and cleaning processes generate more airborne contaminants. Release of the non-grain crop material generates further contaminants. The contaminants can settle on surfaces throughout the combine, including areas that are generally quite hot during operation as well as areas that must be accessed frequently for servicing.

An operating combine also generates noise which must be abated under some standards and requirements.

What is needed in the art is a better way to manage air flow through a cooling system of an agricultural harvester that effectively uses the air flow and protects the system under various operating and non-operating conditions.

SUMMARY OF THE INVENTION

The present invention provides an agricultural vehicle including a cooling system having air flow directing components leading into, through and out of the cooling system.

The invention in one form is directed to an agricultural harvester with an internal combustion engine, and a fluid cooling system for cooling at least one component of the harvester, the fluid cooling system including an airflow inlet and an airflow outlet. An adjustable cover is provided over the fluid cooling system airflow inlet, the adjustable cover having at least an open position and a closed position with respect to the airflow inlet. Structures downstream of the airflow outlet direct airflow from the airflow outlet for at least a second purpose in the operation of the harvester.

The invention in another form is directed to an agricultural harvester with an internal combustion engine, a grain bin and a cooler box disposed between the internal combustion engine and the grain bin. The cooler box has at least one cooling unit therein including a fluid cooler and a fan for cooling at least one component of the agricultural harvester. An inlet to the cooler box and an outlet from the cooler box provide for airflow through the cooler box. A cooler box cover spans an area above the cooler box between the cooler box and the grain bin. The cooler box cover has at least an open position and a closed position.

The invention in still another form is directed to an agricultural harvester with an internal combustion engine, and a grain bin spaced from the internal combustion engine, the grain bin having an upper edge. A cooling system for cooling at least one component of the harvester has a cooler box disposed between the internal combustion engine and the grain bin. A cooler box cover spans an area between the grain bin and the internal combustion engine. The cooler box cover has a hinged end about which the cover is pivoted between closed and opened positions, and a distal end opposite the hinged end. The distal end extends above the upper edge of the grain bin for at least some opened positions of the cover. An air director is disposed between the cooler box and the internal combustion engine.

An advantage of the airflow control system disclosed herein is that a cooling box inlet can be protected from precipitation and contaminant exposure.

Another advantage is that the airflow through the cooling system can be used for multiple purposes.

Yet another advantage is that airflow into, through and out of the cooling system can be related for more efficient performance.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one embodiment of the invention and such exemplification is not to be construed as limiting the scope of the invention in any manner.

DETAILED DESCRIPTION OF THE INVENTION

The terms "grain", "straw" and "tailings" are used principally throughout this specification for convenience but it is to be understood that these terms are not intended to be limiting. Thus "grain" refers to that part of the crop material which is threshed and separated from the discardable part of the crop material, which is referred to as non-grain crop material, MOG or straw. Incompletely threshed crop material is referred to as "tailings". Also the terms "forward", "rearward", "left" and "right", when used in connection with the agricultural harvester and/or components thereof are usually determined with reference to the direction of forward operative travel of the harvester, but again, they should not be construed as limiting. The terms "longitudinal" and "transverse" are determined with reference to the fore-aft direction of the agricultural harvester and are equally not to be construed as limiting.

Figure 1:
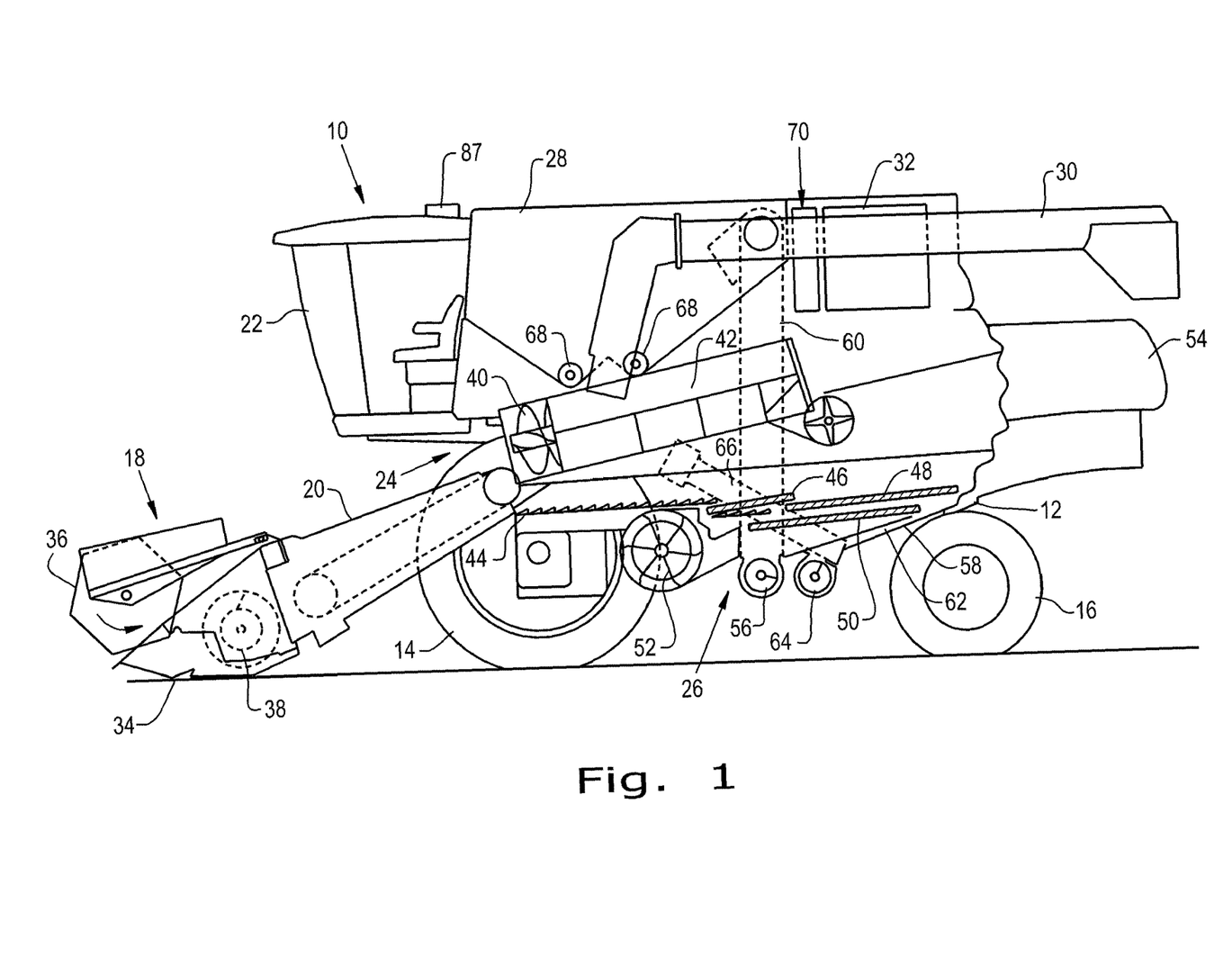
FIG. 1 is a side view of an embodiment of an agricultural vehicle in the form of a combine, which includes an embodiment of a directional control for air flow system as disclosed herein.

Referring now to the drawings, and more particularly to FIG. 1, there is shown an agricultural harvester in the form of a combine 10, which generally includes a chassis 12, ground engaging wheels 14 and 16, a header 18, a feeder housing 20, an operator cab 22, a threshing and separating system 24, a cleaning system 26, a grain tank 28, and an unloading conveyance 30. Unloading conveyance 30 is illustrated as an unloading auger, but can also be configured as a belt conveyor, chain elevator, etc.

Front wheels 14 are larger flotation type wheels, and rear wheels 16 are smaller steerable wheels. Motive force is selectively applied to front wheels 14 through a power plant in the form of a diesel engine 32 and a transmission (not shown). Although combine 10 is shown as including wheels, is also to be understood that combine 10 may include tracks, such as full tracks or half-tracks.

Header 18 is mounted to the front of combine 10 and includes a cutter bar 34 for severing crops from a field during forward motion of combine 10. A rotatable reel 36 feeds the crop into header 18, and a double auger 38 feeds the severed crop laterally inwardly from each side toward feeder housing 20. Feeder housing 20 conveys the cut crop to threshing and separating system 24, and is selectively vertically movable using appropriate actuators, such as hydraulic cylinders (not shown).

Threshing and separating system 24 is of the axial-flow type, and generally includes a rotor 40 at least partially enclosed by and rotatable within a corresponding perforated concave 42. The cut crops are threshed and separated by the rotation of rotor 40 within concave 42, and larger elements, such as stalks, leaves and the like are discharged from the rear of combine 10. Smaller elements of crop material including grain and non-grain crop material, including particles lighter than grain, such as chaff, dust and straw, are discharged through perforations of concave 42.

Grain which has been separated by the threshing and separating assembly 24 falls onto a grain pan 44 and is conveyed toward cleaning system 26. Cleaning system 26 may include an optional pre-cleaning sieve 46, an upper sieve 48 (also known as a chaffer sieve), a lower sieve 50 (also known as a cleaning sieve), and a cleaning fan 52. Grain on sieves 46, 48 and 50 is subjected to a cleaning action by fan 52 which provides airflow through the sieves to remove chaff and other impurities such as dust from the grain by making this material airborne for discharge from straw hood 54 of combine 10. Grain pan 44 and pre-cleaning sieve 46 oscillate in a fore-to-aft manner to transport the grain and finer non-grain crop material to the upper surface of upper sieve 48. Upper sieve 48 and lower sieve 50 are vertically arranged relative to each other, and likewise oscillate in a fore-to-aft manner to spread the grain across sieves 48, 50, while permitting the passage of cleaned grain by gravity through the openings of sieves 48, 50.

Clean grain falls to a clean grain auger 56 positioned crosswise below and in front of lower sieve 50. Clean grain auger 56 receives clean grain from each sieve 48, 50 and from a bottom pan 62 of cleaning system 26. Clean grain auger 56 conveys the clean grain laterally to a generally vertically arranged grain elevator 60 for transport to grain tank 28. Tailings from cleaning system 26 fall to a tailings auger trough 58, and are transported via a tailings auger 64 and a return auger 66 to the upstream end of cleaning system 26 for repeated cleaning action. Cross augers 68 at the bottom of grain tank 28 convey the clean grain within grain tank 28 to unloading auger 30 for discharge from combine 10.

Figure 2:
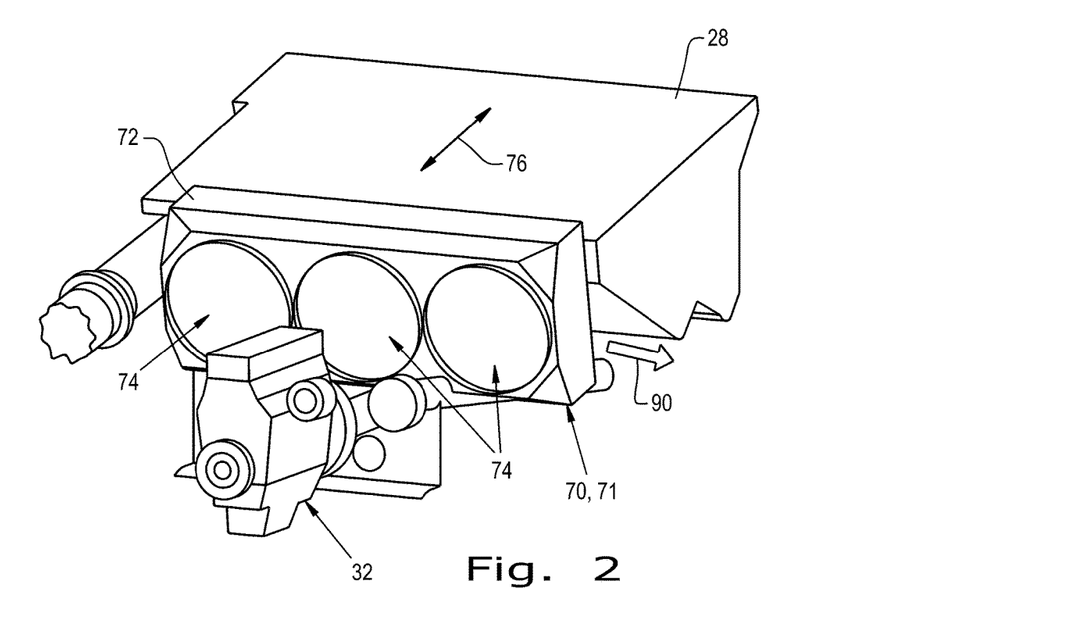
FIG. 2 is a side view of a portion of the internal components of the combine shown in FIG. 1, including the grain tank, IC engine and cooling system shown in FIG. 1.
Figure 3:
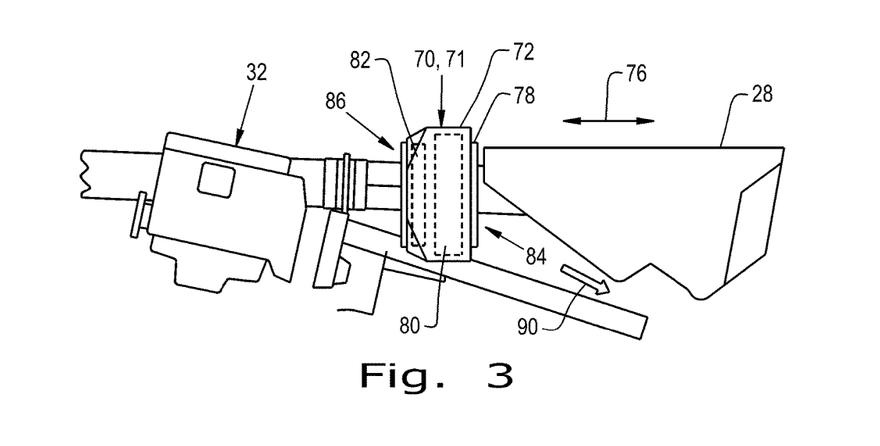
FIG. 3 is a side view of the internal components shown in FIG. 2.

Combine 10 includes a cooling system 70 for cooling at least one component onboard the combine 10 (FIGS. 2-3). For example, cooling system 70 can be used to cool IC engine 32, exhaust and combustion gases associated with IC engine 32, a hydraulic circuit (not shown), an air conditioning (A/C) circuit 87 associated with operator cab 22, and/or other fluid carrying components.

Cooling system 70 is in the form of an integral cooler box 71 that is positioned between IC engine 32 and grain tank 28. The cooler box 71 includes a housing 72, and a plurality of cooling units 74 arranged in a side-to-side manner within housing 72, generally transverse to a fore-aft direction of combine 10, which is indicated by arrow 76. Each cooling unit 74 generally includes a screen 78, a fluid cooler 80 and a fan 82. Screen 78 is at an inlet 84 of the corresponding cooling unit 74, adjacent to grain tank 28, and fan 82 is at an outlet 86 of the corresponding cooling unit 74, adjacent to IC engine 32. Inlet 84 allows air to be drawn into the respective cooling unit 74, and outlet 86 allows air to be exhausted from the respective cooling unit 74. While the exemplary embodiment shown and described includes three cooling units 74, it should be understood that the system disclosed herein can be used also in an agricultural work vehicle having one cooling unit, two cooling units or more than three cooling units.

In the illustrated embodiment, IC engine 32 is located rearward of grain tank 28. Thus, inlet 84 is located at the front of cooler box 71, which faces toward the rear surface of grain tank 28. Conversely, outlet 86 is located at the rear of cooler box 71, which faces toward the front of IC engine 32.

Each fluid cooler 80 is configured for cooling a corresponding type of fluid, such as a cooling fluid for an IC engine, hydraulic oil in a hydraulic power circuit, a refrigerant fluid used in an A/C circuit, etc. The fluid coolers can be configured with any combination of cooling circuits, and can all be the same, partially the same, or all different. In the event that one or more of the fluid coolers 80 are configured different relative to each other, then those cooling circuits are likely independent from each other. However, if multiple fluid coolers are configured the same, then those cooling circuits can be independent from each other or can be coupled together in series or parallel. In the illustrated embodiment, the three fluid coolers 80 are each assumed to be configured differently from each other and independent from each other. One fluid cooler 80 is configured as a radiator for IC engine 32, another fluid cooler 80 is configured as an oil cooler for a hydraulic circuit, and the third fluid cooler 80 is configured as a heat exchange coil for an A/C circuit 87 associated with operator cab 22. The fluid coolers 80 can be configured also as other types of fluid coolers, such as an intercooler or an aftercooler.

Each screen 78 functions as a coarse filter to filter out dust, chaff, etc. from entering the corresponding cooling unit 74. Each screen 78 can be configured as a rotating screen positioned generally vertical or at an acute angle to vertical. Each rotating screen 78 can include a cleaner to remove chaff, dirt, etc. from the screen as it rotates. Each screen 78 can also be configured to be movable toward and away from the respective cooling unit 74 for cleaning of and access to the respective cooling unit 74. Each screen 78 can be manually movable or can be movable using a suitable powered actuator, such as a pneumatic actuator or an electric motor and gear arrangement.

Each fan 82 is configured for moving air through the respective cooling unit 74 for the purpose of effective liquid-to-air cooling. The rotational speed, blade pitch angle, etc. can vary, depending on the particular needs of the particular cooling unit 74. As will be described more fully hereinafter, air flow on the outlet side of cooling unit or units 74 can be used for cooling and/or cleaning various target locations in combine 10. For example, air from the outlet 86 of cooling unit 74 configured as a radiator can be used to both cool, clean and inhibit buildup of dirt and chaff on IC engine 32.

One or more of fans 82 can also be configured for reversal of the air flow direction through the corresponding cooling unit 74. This can be accomplished using a reversible motor, or the blades can have a varying pitch to reverse the air flow direction. When the air is then flowing in the opposite direction, such that inlet 84 is in fact the outlet of the cooling unit 74, the reversed direction flow of air can be used to clean screen 78. Alternatively, the reverse flowing air can be used to clean and/or cool other parts of combine 10. For example, air flowing in a reverse direction, indicated by arrow 90, can be directed under the grain tank 28 toward the outer surface of the concaves for cleaning this area within the combine 10. The screens can be moved away from the cooling unit 74 to allow the air to flow at a higher flow rate and/or velocity for better cleaning. The reverse flowing air also can be used to clean a different selected area within combine 10. To that end, suitable plenums, channels, guides, etc. (not shown) can be used to direct the air to a selected location onboard the combine 10.

Figure 4:
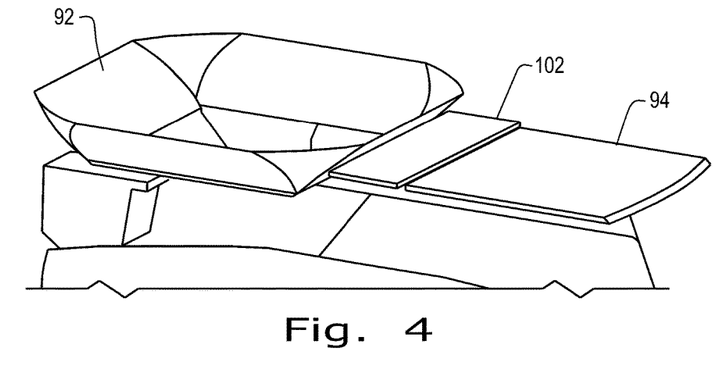
FIG. 4 is a fragmentary perspective view of the combine airflow system.
Figure 5:
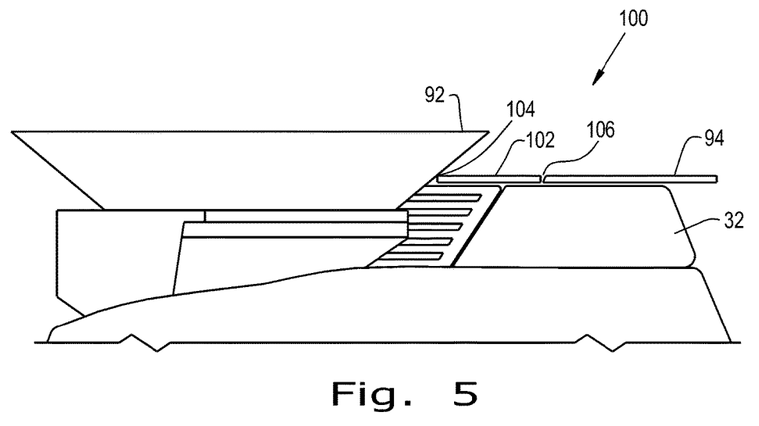
FIG. 5 is a side view of the portion of the combine shown in FIG. 4.
Figure 6:
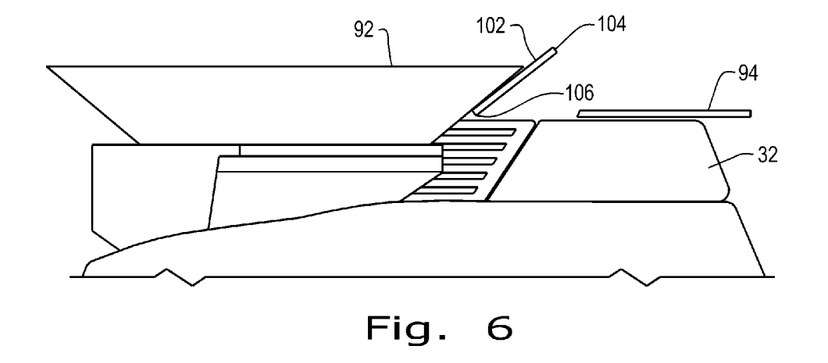
FIG. 6 is a side view similar to that shown in FIG. 5, but illustrating the airflow system in a different state of adjustment.

Referring now to FIGS. 4-6, an airflow directional control system 100 is shown with combine 10 illustrated in various stages of preparation for, or use during a harvesting operation. Accordingly, inwardly foldable extensions 92 at the top grain tank 28 have been outwardly folded. System 100 includes a cooler box cover 102 provided over a space between inlet 84 and grain tank 28. As shown in FIGS. 4 and 5, with cooler box cover 102 in a closed position, cooler box cover 102 is aligned with an engine cover 94. If cooler box cover 102 and engine cover 94 are provided of sufficiently strong, durable material, cooler box cover 102 and engine cover 94 can be used as walkways or standing platforms in intended service paths on combine 10 for servicing or maintaining combine 10. For example, if manual manipulation or servicing is required for foldable extensions 92 or other service in or around grain box 28 is required, a service individual or operator can traverse over or stand on cooler box cover 102. When closed, cooler box cover 102 covers the open area or space above cooler box 71 between cooler box 71 and grain tank 28. Accordingly, when cooler box cover 102 is closed, contaminants and precipitation are kept out of cooler box 71. If lightweight contaminants such as chaff or dust have settled in cooler box 71, the introduction of precipitation would make subsequent cleaning more difficult. By closing cooler box cover 102 the dust, chaff or other lightweight contaminants are kept dry, and subsequent cleaning can proceed more easily. Accordingly, it can be advantageous to keep cooler box cover 102 closed when combine 10 is not operating.

FIG. 6 illustrates cooler box cover 102 in a fully opened condition. As shown, a distal end 104 of cooler box cover 102, opposite a hinged end 106, extends above the upper edge of foldable extensions 92. Accordingly, a further barrier is provided to prevent contaminants blowing from grain tank 28 or grain tank spillover from entering inlet 84 and potentially fouling or plugging screen or screens 78. Due to the high volume and velocity of air drawn into inlet 84, there can be a tendency to draw contaminants from grain tank 28 toward inlet 84, and cooler box cover 102 can be used to inhibit that tendency.

It should be understood further that cooler box cover 102 can be adjusted to positions intermediate the fully closed, maximum protecting position illustrated in FIGS. 4 and 5 and the fully opened, maximum airflow position illustrated in FIG. 6. Opening to an intermediate position may be useful under conditions when less than full capacity cooling is required. Accordingly, cooler box cover 102 can be adjusted to provide protection against contaminants entering cooler box 71 while allowing adequate air circulation for cooling, both dependent on the conditions of operation.

Adjustment of the position for cooler box cover 102 can be manual or mechanical. Further, adjustment can be determined by an operator of combine 10 or can be control logic determined. Suitable controls and actuators can be provided for adjusting the position of cover 102. Advantageously, a switch or other operator is provided in a convenient location near to cooler box cover, or at least outside cab 22 so that the cover can be opened or closed as needed during servicing of combine 10, without the need to climb to and enter cab 22. Cooler box cover 102 can be actuated to open to a set parameter, depending on performance requirements and operating conditions. By linking the operation of cooler box cover 102 to a grain tank level sensor the cover can help prevent drawing of material or contaminants over tank extensions 92 and into inlet 84.

Figure 7:
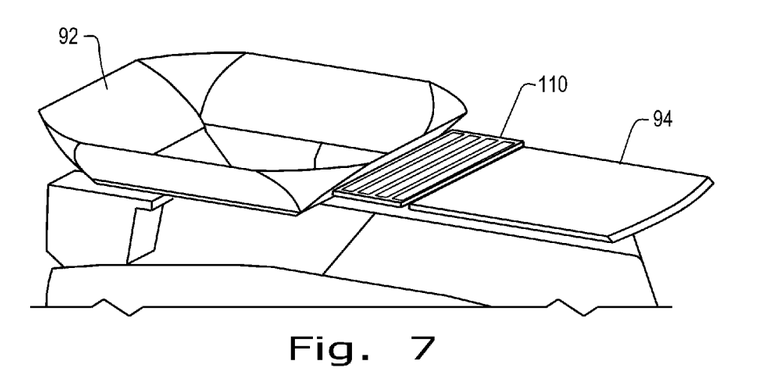
FIG. 7 is a perspective view similar to that of FIG. 4, but illustrating a second embodiment of the system.
Figure 8:
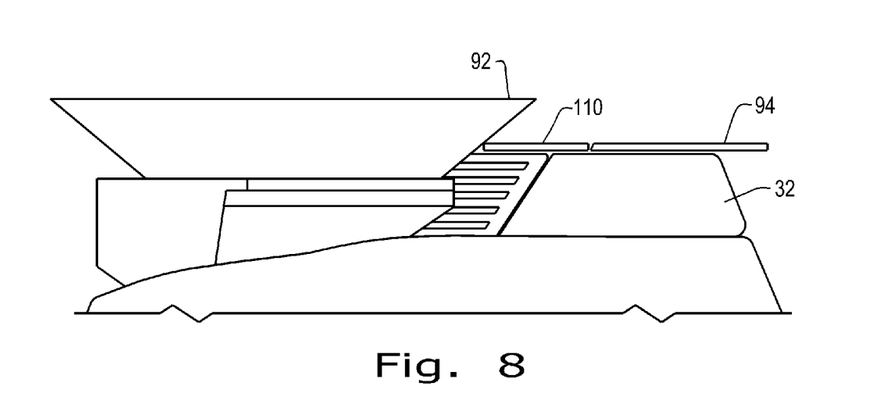
FIG. 8 is a side view of the structure shown in FIG. 7
Figure 9:
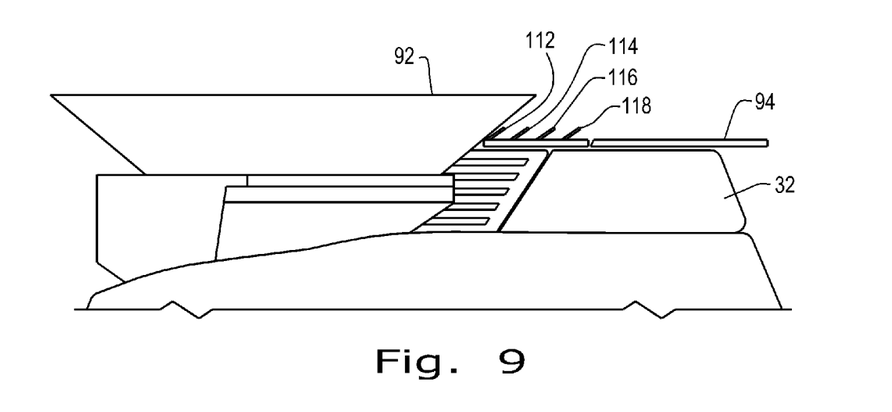
FIG. 9 is a side view similar to that of FIG. 8, but illustrating the system in a different state of adjustment.

As shown and described, cooler box cover 102 is one piece. FIGS. 7, 8 and 9 illustrate a cooler box cover 110 including a plurality of segments or inlet vanes 112, 114, 116, 118. In the exemplary embodiment, four inlet vanes are shown; however, it should be understood that more or fewer inlet vanes also can be used. Further, each inlet vane can be independently controlled, or a single inlet vane adjuster can be used to adjust all inlet vanes simultaneously. As with cooler box cover 102, cooler box cover 110 can be provided of sufficiently strong, durable material to serve as a walkway or standing platform on combine 10. Cooler box cover 110 can be used in ways similarly to the ways of use described for cooler box cover 102, and each vane 112, 114, 116, 118 can be adjusted to various positions between fully closed positions shown in FIGS. 7 and 8 and fully opened positions shown in FIG. 9.

Figure 10:
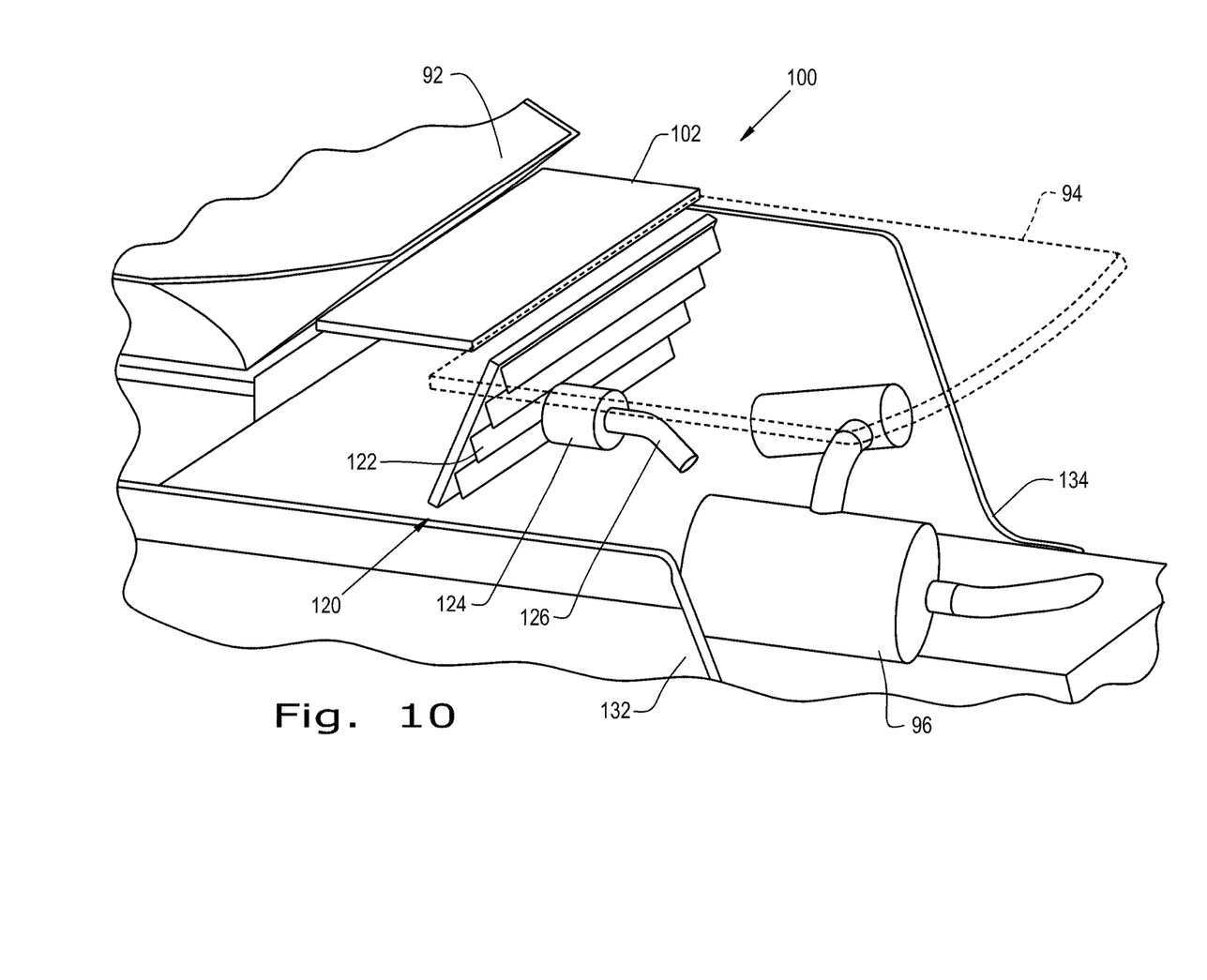
FIG. 10 is a further perspective view of the airflow system, grain tank and engine of the combine.

A further feature of system 100 is shown in FIG. 10. An air director 120 is provided downstream from outlet 86, between cooler box 71 and engine 32. Air director 120 can include a plurality of features for directing air from outlet 86 to perform a second purpose during the operation of combine 10. For example, outlet vanes 122 can be provided to direct outlet air from fans 82 toward target areas of engine 32 that can benefit from cooling and/or cleaning. For example, airflow can be directed to components of an exhaust system for engine 32, to a turbocharger, gearboxes and/or a rear deck area of combine 10. Outlet vanes 122 can be fixed or adjustable, and if adjustable can be manually adjustable, mechanically adjustable and operator directed or logic controlled. Outlet vanes 122 can direct airflow toward target locations, such as a muffler 96, which can benefit from a cooling airflow. Outlet vanes 122 also can direct airflow toward target locations that can benefit from a cleaning airflow, to inhibit the build up of contaminants. By way of example, a cleaning airflow can be directed toward service areas, to keep the service areas both cool and clean from dirt and dust settling thereon. Directing airflow towards fluid fill openings and/or dipsticks can protect engine 32 from contamination when the fill opening is opened or the dipstick is removed to measure the fluid fill level.

Air director 120 can be up of configurations other than, or in addition to inlet vanes 122. For example, an air scoop 124 can be used to capture some of the airflow and direct the airflow to target locations to be cleaned or cooled. Air scoop 124 can be connected to a duct 126. Other suitable plenums, channels, guides, etc. (not shown) can be used to direct airflow to selected target locations in engine 32 or other locations in combine 10.

Figure 11:
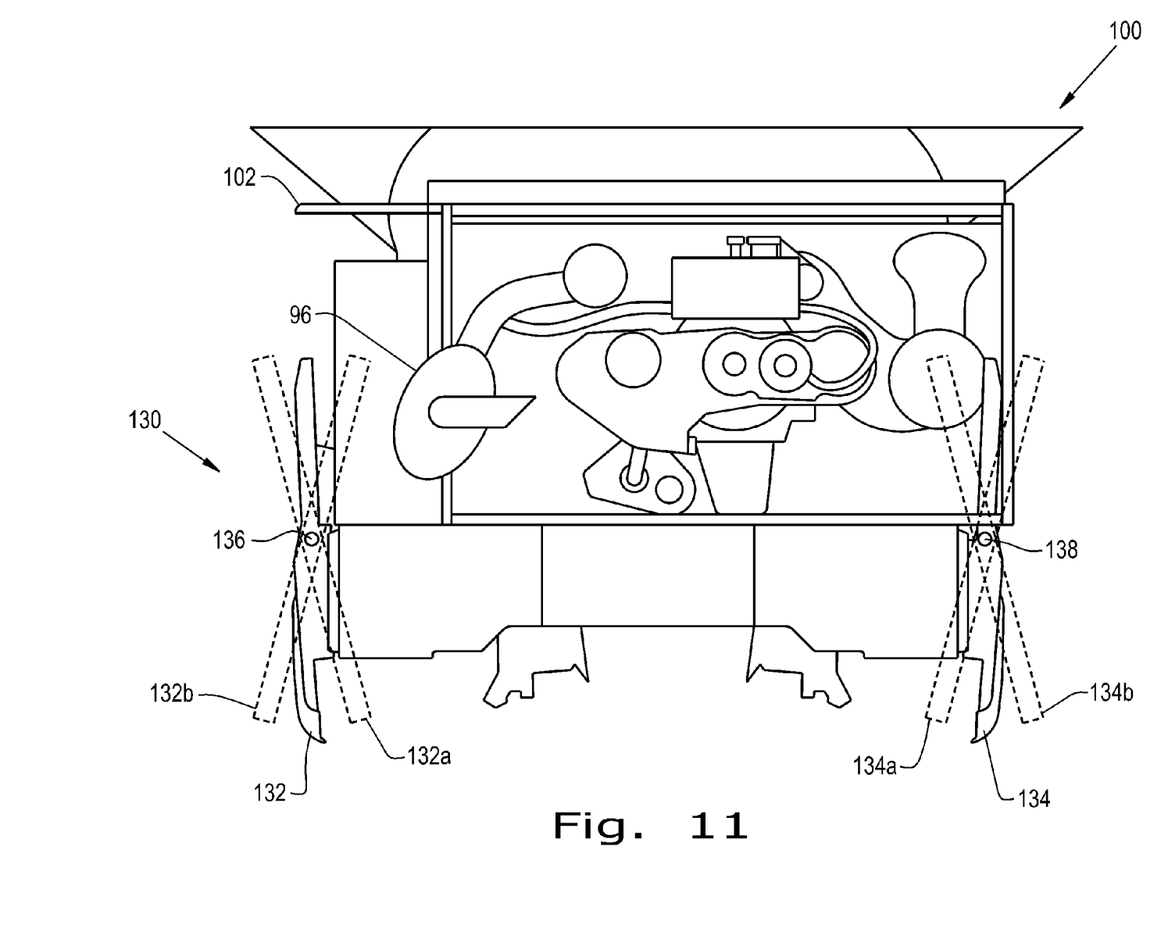
FIG. 11 is an end view of the combine.

A still further feature of system 100 is shown in FIG. 11, wherein a side panel adjustment system 130 is shown. Side panel adjustment system 130 includes side panels 132, 134 that are pivotal about substantially horizontal pivots 136, 138 respectively. Side panels 132, 134 are adjustable so as to angle downwardly inward or downwardly outward as shown by phantom locations 132*a*, 134*a* and 132*b*, 134*b* respectively. Pivoting side panels 132, 134 about pivots 136, 138 allows for adjustment to further direct airflow from outlet 86 as desired. Adjusting the angle of panels 132, 134 can be beneficial for the additional purpose of exhausting debris and/or directing noise upward or downward in response to existing conditions. Actuation of side panels 132, 134 can be based on wind direction and operating conditions. Together with adjusting positions for cooler box cover 102 or cooler box cover 110, side panels 132, 134 can be adjusted to direct air based on machine position relative to wind direction and speed, thereby facilitating the supply of clean air to inlet 84.

The system for directional control of airflow has been described herein with respect to a combine harvester in which cooler box 71 is immediately adjacent to and only minimally spaced from grain tank 28. However, it should be understood that the system described herein can be used advantageously also when greater spacing is provided, and/or when a structure or structures other than a grain tank, such as, for example, a fuel tank is provided adjacent the cooler box.

While a system for directional control of airflow has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An agricultural harvester, comprising:
    an internal combustion engine;
    a fluid cooling system for cooling at least one component of the harvester, said fluid cooling system including an airflow inlet and an airflow outlet;
    an adjustable cover over said fluid cooling system airflow inlet, said adjustable cover having at least an open position and a closed position with respect to said airflow inlet; and
    structures downstream of said airflow outlet, said structures downstream of said cooling system airflow outlet include side panels adjustable about substantially horizontal axes, said side panels being adjustable between positions that are downwardly angled inward and positions that are downwardly angled outward relative to a vertical position, said airflow outlet directing airflow from said airflow outlet downstream to the side panels.

2. The agricultural harvester of claim 1, wherein said adjustable cover is a one-piece body.

3. The agricultural harvester of claim 2, wherein said structures downstream of said cooling system airflow outlet include an air director between said fluid cooling system airflow outlet and said engine.

4. The agricultural harvester of claim 2, wherein said structures downstream of said cooling system outlet include a side panel adjustment system downstream from said engine.

5. The agricultural harvester of claim 4, wherein said structures downstream of said cooling system airflow outlet further include an air director between said fluid cooling system outlet and said engine.

6. The agricultural harvester of claim 1, wherein said cover includes a plurality of adjustable inlet vanes.

7. The agricultural harvester of claim 1, wherein said structures downstream of said airflow outlet include an air director having vanes between said fluid cooling system airflow outlet and said engine, and airflow from said vanes is directed at a target location in the harvester for at least one of cooling and cleaning at the target location.

8. The agricultural harvester of claim 1, wherein said cover is disposed in an intended service path on said harvester.

9. An agricultural harvester, comprising:
an internal combustion engine;
a grain bin;
a cooler box disposed between said internal combustion engine and said grain bin, said cooler box having at least one cooling unit therein including a fluid cooler and a fan for cooling at least one component of the agricultural harvester;
an inlet to said cooler box and an outlet from said cooler box for airflow through said cooler box;
a cooler box cover spanning an area above said cooler box between said cooler box and said grain bin, said cooler box cover having at least an open position and a closed position;
an air director downstream from the outlet; and
side panels adjustable about substantially horizontal axes, said side panels being adjustable between positions that are downwardly angled inward and positions that are downwardly angled outward relative to a vertical position, said side panels being downstream from said air director.

10. The agricultural harvester of claim 9, wherein said cooler box cover is disposed in an intended service path on said harvester.

11. The agricultural harvester of claim 9, wherein said cooler box cover includes a plurality of adjustable inlets.

12. The agricultural harvester of claim 9, wherein said cooler box cover includes a distal end, and said the distal end extends above an upper edge of said grain bin for at least one opened position of said cooler box cover.

13. The agricultural harvester of claim 9, wherein said air director is disposed between said outlet from said cooler box and said internal combustion engine, said air director directing airflow from said outlet downstream toward said side panels.

14. The agricultural harvester of claim 13, said air director including structures targeting airflow from said outlet to a targeted location in said harvester, said airflow directed by said air director being utilized for at least one of a cleaning airflow and a cooling airflow at the targeted location.

* * * * *